United States Patent [19]

McCormic

[11] 3,720,118
[45] March 13, 1973

[54] INTEGRATED SERVO ACTUATOR
[75] Inventor: Joseph McCormic, Pawling, N.Y.
[73] Assignee: Delta Hydraulics, Inc., Braintree, Mass.
[22] Filed: March 17, 1971
[21] Appl. No.: 125,333

Related U.S. Application Data

[63] Continuation of Ser. No. 808,749, March 20, 1969, abandoned.

[52] U.S. Cl. ..................91/47, 91/363 R, 91/417 R
[51] Int. Cl. ........................F15b 13/16, F15b 15/17
[58] Field of Search.....91/52, 363, 47, 386, 361, 417

[56] References Cited

UNITED STATES PATENTS

| 2,789,543 | 4/1957 | Popowsky | 91/386 |
| 3,430,536 | 3/1969 | Oelrich | 91/47 |
| 3,464,318 | 9/1969 | Thayer et al. | 91/363 |
| 3,516,331 | 6/1970 | Oelrich et al. | 91/41 |
| 3,521,535 | 7/1970 | Oelrich | 91/361 |

Primary Examiner—Paul E. Maslousky
Attorney—Wolf, Greenfield & Sacks

[57] ABSTRACT

An integrated servo actuator including in a single package a force motor, a fluid modulator controlled directly by the force motor, and an actuator movable in response to the characteristic flow of fluid through the modulator. An integral potentiometer mounted in the housing produces a signal which is a function of the actuator position.

9 Claims, 3 Drawing Figures

FIG. I

INVENTOR.
JOSEPH McCORMICK

INTEGRATED SERVO ACTUATOR

This application is a continuation of application Ser. No. 808,749, now abandoned, filed Mar. 20, 1969.

This invention comprises a new and improved integrated servo actuator.

At the present time in order to achieve the function performed by the present invention, three separate and physically unrelated elements are required; namely, a force motor, some form of hydraulic converter, and a final control element. These separate devices must be specially matched, are expensive, and occupy a considerable volume.

One important object of this invention is to integrate the various components of a servo actuator control into a unitary structure.

Another important object of this invention is to dynamically couple the several elements of a servo actuator control to increase the speed of response and eliminate play or backlash which is necessarily present when the various parts in a linked system are physically separated.

And another important object of this invention is to provide an integrated servo actuator which may be modified or changed to achieve different gain combinations as desired for the particular application in which the unit is used.

To accomplish these and other objects the integrated servo actuator of this invention includes in a single housing a force motor, a modulator, and an actuator which are dynamically coupled together and cooperate with one another directly. Thus, a control signal may be fed to the device and internally the unit converts the signal to a mechanical displacement, and in turn to a pressure or flow valve, and finally to a mechanical displacement of a different order of magnitude as the control actuation. In the preferred form of this invention, the servo actuator includes an integral position feedback element which allows the unit to provide closed loop control.

These and other objects and features of this invention along with its incident advantages will be better understood and appreciated from the following detailed description of one embodiment thereof, selected for purposes of illustration and shown in the accompanying drawing, in which.

Figure 1:
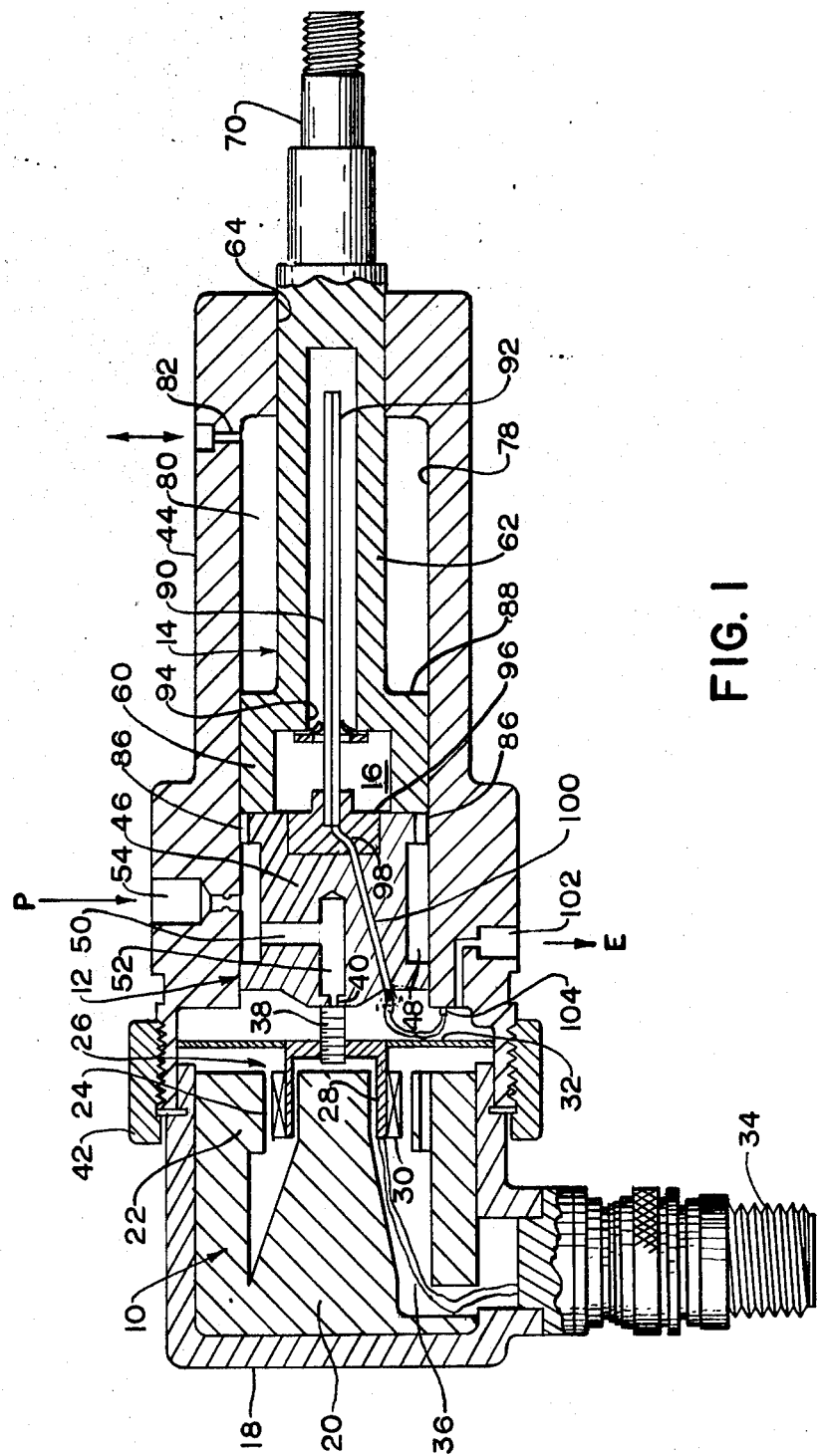
FIG. 1 is a cross sectional view of an integrated servo actuator constructed in accordance with this invention.

The integrated servo actuator shown in the drawing generally includes three stages; namely, a force motor 10, a modulator element 12, and a servo actuator 14. An integral position feed back assembly 16 is disposed in the servo actuator. These various components are described in detail below.

The force motor assembly 10 is disposed in a cap 18 and includes inner and outer pole pieces 20 and 22 which together define a gap 24 in which is located a bobbin 26. The bobbin includes a collar 28 about which coil 30 is wound, and a spring 32 supports the bobbin 26 for axial motion in the gap 24 as the coil 30 moves in response to its energization. An electrical conduit may be connected to the cap 18 by means of the coupling 34, and the leads which control the energization of the coil 30 extend through the coupling 34 and the passage 36 to the coil 30. The displacement of the coil 30 with bobbin 26 is directly proportional to the excitation of the coil acting against the supporting mechanical spring 32.

The bobbin 26 also carries a null screw 38 which controls the discharge through orifice 40 of the modulator 12. It is evident from an inspection of the drawing that the null screw 38 may be adjusted in the bobbin 26 by means of the thread connection between the two.

An internally threaded collar 42 secures the cap 18 to the main housing 44 which contains the modulator 12 and the servo actuator 14. The housing 44 is open to the force motor 10 and supports the modulator 12 immediately adjacent the end of the null screw 38 with the orifice 40 positioned to be controlled by the null screw.

The modulator 12 is primarily formed in a cylinder 46 which is secured in place in the housing 44 and has an annular recess 48 in its outer surface which defines a pressure chamber in which the control pressure is generated and transmitted to the servo actuator 14. The control chamber 48 communicates through a port 50 with axial passage 52 which terminates at the orifice 40. Thus, when the inlet 54 is connected to a pressure source, either liquid or gas, the pressure in the control chamber 48 is in turn controlled by the size of the orifice 40. It is evident that when the null screw 38 is moved away from the orifice 40 so as to effectively increase the orifice size, the pressure in the control chamber 48 diminishes assuming that the pressure of the fluid being fed to the annular chamber 48 remains constant. Thus, the excitation of the coil 30 of the force motor directly controls the pressure in the control chamber 48 by varying the size of the orifice.

The servo actuator 14 is in the form of a piston 60 integrally formed with a piston rod 62 that extends through the opening 64 in the end 66 of the housing. The servo actuator 14 and more particularly its piston rod 62 cooperates with the inner surface 78 of the housing 44 to define a bias or reference pressure chamber 80. A port 82 is provided in the housing 44 to provide bias pressure in chamber 80, and the port 82 may be connected to the same source of pressure source as the inlet port 54.

A number of passages 86 are formed in the cylindrical body 46. Thus, the pressure of the fluid in the control chamber 48 may be applied against the end surface of the servo actuator 14. The area against which the pressure may be applied on the left side of the piston 60 is equal to the entire cross sectional area of the housing cavity, which is considerably greater than the area defined by the shoulder 88 exposed to the bias pressure in chamber 80. Although the contour of the end of piston 60 is irregular, nevertheless its entire cross section is exposed to the pressure in chamber 48. If the pressures in the control chamber 48 and reference pressure chamber 80 is the same, it is apparent that the piston will move to the right as viewed in the drawing because of the difference in areas. Typically the area ratio may be a simple fraction such as 1:2.

The position feed back assembly 16 integral with the actuator includes a potentiometer 90 in the form of a bimetal bar 92 which extends into the cavity 94 provided in the piston rod 62 of the servo actuator 14. The potentiometer 90 is supported by an insulation base 96 fixed to the spool body 46, and a brush assembly 98 is carried by the piston 60. Consequently, as the servo actuator 14 moves in the housing 44 under the influence of the differential pressure applied to the piston, the brush assembly moves along the bimetal rod 92 so as to produce a signal which is an electrical read out of the position of the actuator. The signal may be fed back to the signal supplied to the force motor to form a simple closed servo loop. It will be noted that leads 98 are shown connected to the ends of the bimetal bar 92, which leads extend through the hole 100 formed in the cylindrical body 46 of the modulator 12, and are connected to terminal 104. The leads from the terminal 104 may extend through an opening (not shown) in the spring support 32 and through the hole 36 in the pole piece 20 and exit from the unit through the coupling 34.

Figure 2:
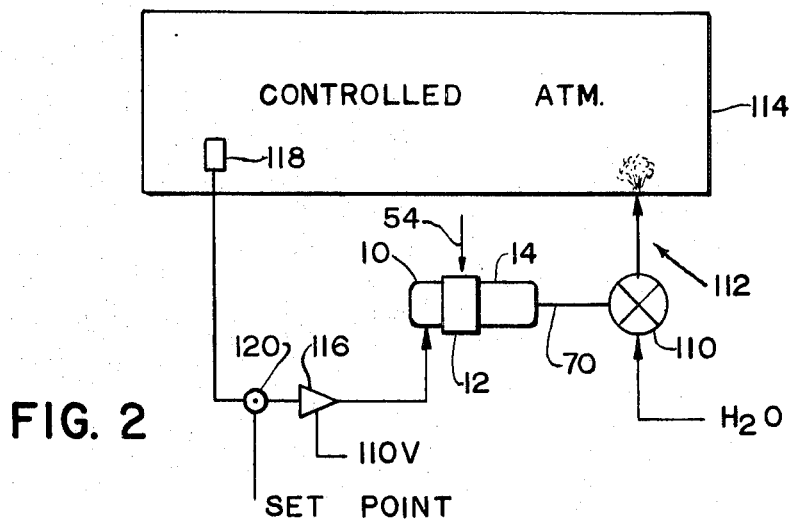
FIG. 2 is a diagram showing one application of this invention.

Having described the unit in detail, two typical applications of the device will be presented in order to afford a full understanding of the invention. In one typical installation of the integrated servo actuator of this invention, the device may be used to regulate the humidity of a controlled atmosphere in a manufacturing process. Such an installation is shown in FIG. 2. The actuator piston rod 70 controls a needle valve 110 in a spray system 112 for discharging water in the controlled atmosphere 114. The force motor 10 is supplied a signal through an amplifier 116 from a humidity sensor 118 mounted in the atmosphere being controlled. Compressed air is supplied the modulator 12 through inlet 54 from a suitable source. It will be noted in the FIG. 1 that an exhaust port 102 is provided in the housing of the device to relieve pressure in the housing to the left of the cylindrical body 46. Obviously a set point is established for the desired humidity, and when the humidity sensor 118 determines that the humidity in atmosphere 114 has deviated from that set point, the signal impressed on the coil 30 of the motor is changed so as to move the null screw 38 to vary the orifice 40 to in turn change the pressure in the control chamber 48. Consequently, the piston 60 moves to vary the setting of the piston rod 70 to effect a change in the position of the needle valve 110 controlled by it. When the humidity in the controlled atmosphere reaches the desired setting, the humidity sensor so indicates to the summing network 120, and with the system once again in balance the actuator 14 remains stationary.

Figure 3:
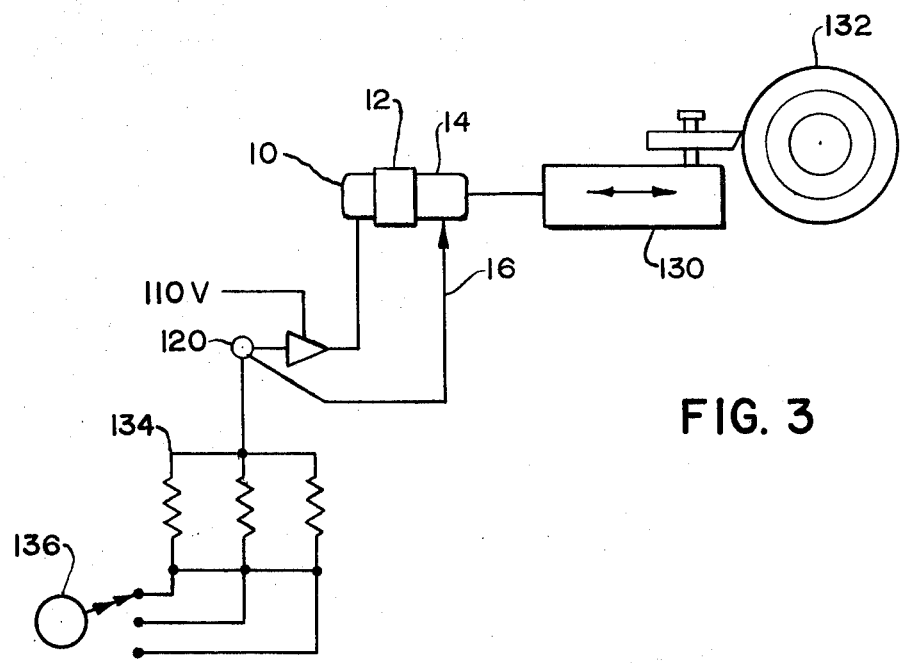
FIG. 3 is a diagram showing another application of this invention.

In the foregoing typical installation of the integrated servo actuator, the position feed back element 16 is not utilized. In the installation suggested in FIG. 3 it is utilized. In this installation the unit is used to control the operation of a lathe 130 which is employed typically to cut a work piece 132 having a plurality of radii as suggested. An input signal is fed to the force motor 10, the magnitude of which is controlled by a patch board 134 and a sequencing switch 136. The lathe is positioned by the rod 70, and the potentiometer signal is fed to the summing network to form a closed loop to null the system when the lathe is in the precise position as indicated by the feed back element 16. In this way precise positioning of the lathe is achieved to form the desired radii in the work piece.

From the foregoing description it will be apparent that the device of this invention has numerous applications, and that modifications may be made of the device to fit the specific application intended. Further, the configuration of the modulator may take any one of a number of forms. For example, while a modulating orifice is shown, a direct acting spool valve element could be used to achieve the same purpose. The use of such devices will provide the range of gain required of the device.

What is claimed is:

1. An integrated servo actuator comprising
    a housing having means defining an elongated passage,
    a force motor assembly disposed toward one end of the housing,
    a fluid modulator mounted in the passage of the housing, means for directing a fluid under pressure through the modulator,
    a control member forming part of the force motor assembly for controlling the modulator,
    an actuator mounted in the passage of the housing, aligned in the same direction with the modulator, and changing position in response to changes in the flow through the modulator,
    said modulator having a surface in facing relationship to said actuator,
    said actuator having means defining an elongated cavity,
    and an elongated potentiometer disposed at least in part within said elongated cavity secured to and extending from the surface of said modulator and operatively coupled to said actuator for producing a signal which is a function of the position of said actuator said modulator including at least one passage adjacent said housing for applying pressure to one side of said actuator.

2. An integrated servo actuator as described in claim 1 further characterized by
    an orifice forming part of the modulator, and said control member forming part of the force motor and moving to change the size of the orifice.

3. An integrated servo actuator as described in claim 1 further characterized by
    said modulator and control member together defining a variable orifice,
    and a pressure chamber in the modulator in communication with the actuator for controlling the actuator position,
    said orifice controlling the pressure in the chamber.

4. An integrated servo actuator as described in claim 1 further characterized by
    said modulator having an inlet for a fluid pressure source and an orifice through which the fluid discharges,
    a chamber in the modulator through which the fluid flows, upstream of the orifice, said control member varying the size of the orifice to vary the pressure in the chamber,
    said actuator including a piston slidable in the housing,
    said modular passage adjacent said housing connected to the chamber for applying the chamber pressure adjacent one side of the piston,
    and a biasing force exerted against the opposite side of the piston.

5. An integrated servo actuator as described in claim 1 further characterized by said potentiometer comprising a metal bar,
and a circuit including brushes in contact with the bar.

6. An integrated servo actuator as described in claim 4 further characterized by
said force motor including a movable coil member and fixed pole pieces,
said coil member carrying the control member to vary the orifice size.

7. An integrated servo actuator as described in claim 1 further characterized by
said modulator including means defining a passage for accommodating a pair of wires of said potentiometer.

8. An integrated servo actuator as described in claim 7 further characterized by
said elongated cavity being cylindrical in shape and located centrally of said actuator.

9. An integrated servo actuator as described in claim 1 further characterized by
said actuator having brush means touching said potentiometer wherein said potentiometer is movable with reference to said brush means in response to movement of said actuator.

* * * * *